No. 676,204. Patented June 11, 1901.
F. RIPPLEY.
COMPRESSED AIR SPRAYER.
(Application filed Sept. 4, 1900.)
(No Model.)

Witnesses:
Alfred A. Eicher
Jarome Bresnham

Inventor
Frank Rippley
By Higdon & Longan, Atty's

UNITED STATES PATENT OFFICE.

FRANK RIPPLEY, OF GRAFTON, ILLINOIS.

COMPRESSED-AIR SPRAYER.

SPECIFICATION forming part of Letters Patent No. 676,204, dated June 11, 1901.

Application filed September 4, 1900. Serial No. 28,889. (No model.)

*To all whom it may concern:*

Be it known that I, FRANK RIPPLEY, of the city of Grafton, Jersey county, State of Illinois, have invented certain new and useful Improvements in Compressed-Air Sprayers, of which the following is a full, clear, and exact description, reference being had to the accompanying drawings, forming a part hereof.

This invention relates to compressed-air sprayers; and it consists of the novel construction, combination, and arrangement of the parts hereinafter shown, described, and claimed.

The object of my invention is to provide an improved sprayer specially for the use of farmers, florists, liverymen, and fruit, tobacco, or celery growers, truck-gardeners, dairymen, and fancy stock or poultry breeders which shall operate by means of compressed air.

Figure 1:
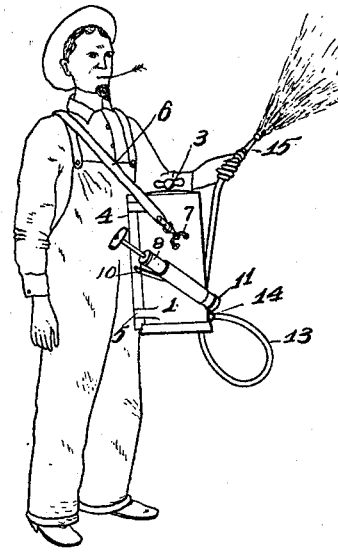
Figure 2:
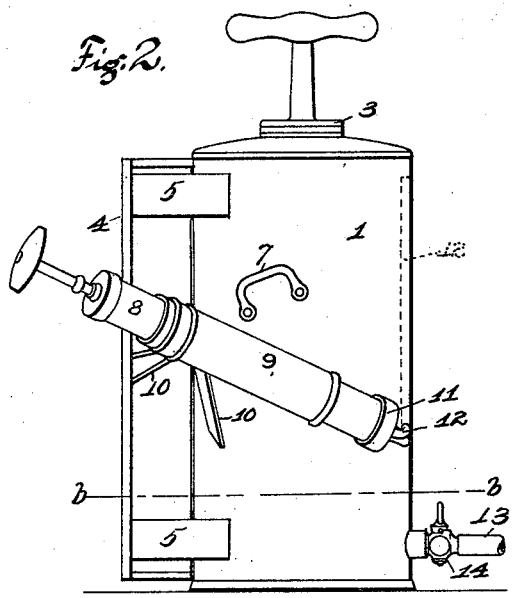
Figure 3:
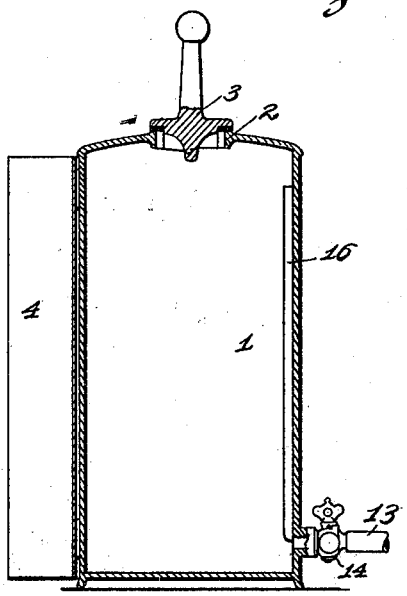
Figure 4:
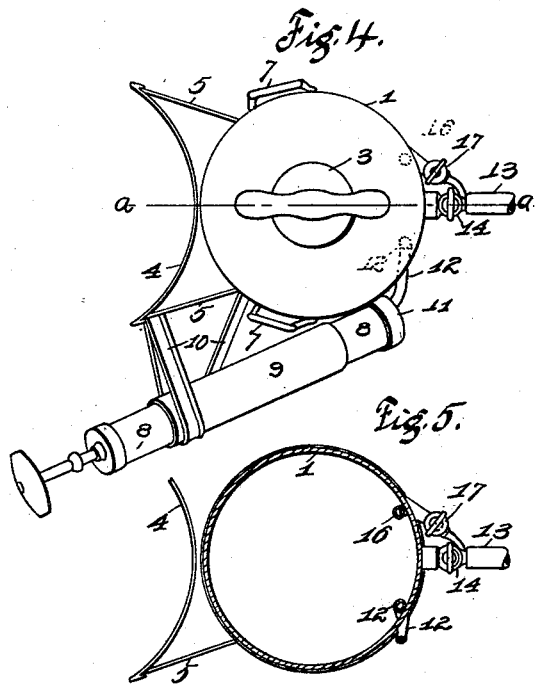
Figure 5:
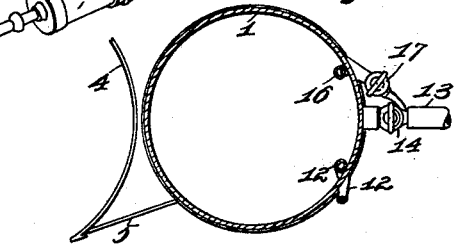

In the drawings, Figure 1 is a perspective view illustrating the operation of one form of the sprayer. Fig. 2 is a side elevation of the same. Fig. 3 is a sectional elevation taken on the line *a a* of Fig. 4. Fig. 4 is a top plan view. Fig. 5 is a sectional plan view taken on the line *b b* of Fig. 2.

1 indicates a tank for holding the liquid and containing the air under pressure. Said tank is provided at its top with a suitable filling-opening 2, provided with any common form of air-tight closure 3. Upon one side of said tank is fixed a concaved shield 4, which extends parallel with said tank, almost the full length of the latter, and is connected therewith by means of suitable braces 5, whereby the body of the wearer may fit within said concavity during use of the device and hold the latter more securely in position. Further means of supporting the device on the body of the wearer is shown in Fig. 1. I provide the shoulder-strap 6, which is adapted to be extended over one shoulder and thereby support the device in position. The ends of said shoulder-strap 6 may be connected by means of snap-hooks or other common fastenings with suitable loops or rings 7, secured to opposite sides of said tank.

8 indicates the barrel of a common air-pump, loosely mounted to slide in a cylindrical shield 9, fixed at an angle to one side of said tank 1 by means of suitable brackets or braces 10, and said pump-barrel is detachably threaded into a socket 11, fixed upon the side of said tank.

12 indicates an air-pipe for conveying air from said pump into said tank, and said pipe extends from said socket in through the wall of said tank and upwardly therein to a point adjacent the top of the tank 1, as shown by dotted lines in Fig. 2.

13 indicates a hose through which the liquid is discharged from the tank, and said hose is connected, preferably, to the tank at a point near the bottom thereof and is provided with a common valve or stop-cock 14, the outer end of which may be provided with any common nozzle 15.

16 indicates an eduction air-pipe, which extends upwardly within said tank 1 to a point adjacent the top thereof, (see Fig. 3,) and thence passes through the wall of said tank adjacent the lower end thereof and connects with the liquid-discharge pipe 13 and is provided with a valve or faucet 17 at a point exterior of the said tank for a purpose hereinafter mentioned.

The operation is as follows: The tank 1 is to be filled about two-thirds full with any approved solution, or it may be whitewash, if the device is to be used for spraying paint or whitewash. Then the tank is to be charged with compressed air by operating the air-pump until a suitable amount of air is compressed above the liquid therein contained. The pressure can be readily determined by the increased amount of force required to work the pump. When it is desired to use the device as a common sprayer, the stop-cock 14 is opened, so that the liquid is expelled through the hose 13 and nozzle 15, as shown in Fig. 1.

I claim—

In a compressed-air sprayer, a main tank, a cylindrical shield 9 attached to one side of said main tank and being at an incline, a threaded socket 11 in alinement with said shield, an air-pump mounted within said shield, and having its lower end threaded into the socket, an air-pipe 12 leading from said socket into the main tank and extending upwardly to near the top thereof, an outlet-pipe 13 leading from near the bottom of the main tank, a stop-cock for controlling said outlet, an eduction air-pipe 16 within the main tank and leading from near the top to the bottom and being extended through the wall and being connected to the outlet 13, and a valve 17 for controlling the passage of the air through said pipe 16, substantially as specified.

In testimony whereof I affix my signature in presence of two witnesses.

FRANK RIPPLEY.

Witnesses:
WILLIAM BROWER,
MASON CALLAWAY.